United States Patent [19]
Allen et al.

[11] Patent Number: 5,233,613
[45] Date of Patent: Aug. 3, 1993

[54] RELIABLE WATCHDOG TIMER

[75] Inventors: Bruce R. Allen, Buda; Arthur B. Oliver, Austin; Robert W. O'Dell, Austin; James E. Bowles, Austin, all of Tex.

[73] Assignee: Advanced Micro Devices, Inc., Sunnyvale, Calif.

[21] Appl. No.: 725,233

[22] Filed: Jun. 26, 1991

Related U.S. Application Data

[63] Continuation of Ser. No. 174,754, Mar. 29, 1988, abandoned.

[51] Int. Cl.[5] ............................................. G06F 11/00
[52] U.S. Cl. ................................. 371/16.3; 395/575; 364/DIG. 1; 364/264; 364/265; 364/270
[58] Field of Search .................. 371/16.1, 16.3, 62; 395/575; 377/39

[56] References Cited

U.S. PATENT DOCUMENTS

| | | | |
|---|---|---|---|
| 3,878,370 | 4/1975 | Santomango et al. | 377/39 |
| 3,919,533 | 11/1975 | Einolf, Jr. et al. | 371/62 |
| 4,161,649 | 7/1979 | Klos et al. | 377/39 |
| 4,410,938 | 10/1983 | Higashiyama | 364/200 |
| 4,538,273 | 8/1985 | Lasser | 371/16.3 |
| 4,566,111 | 1/1986 | Tanagawa | 377/39 |
| 4,597,052 | 6/1986 | Matsuda | 364/200 |
| 4,618,953 | 10/1986 | Daniels et al. | 364/200 |
| 4,636,967 | 1/1987 | Bhatt et al. | 377/39 |
| 4,705,970 | 11/1987 | Turnpaugh | 371/62 |
| 4,727,549 | 2/1988 | Tulpule et al. | 371/16.3 |
| 4,796,211 | 1/1989 | Yokouchi et al. | 371/62 |
| 4,912,708 | 3/1990 | Wendt | 371/16.3 |

FOREIGN PATENT DOCUMENTS 59-121555 7/1984 Japan .

OTHER PUBLICATIONS

*Computer Architecture and Organization* by John P. Hayes, McGraw-Hill, 1978, pp. 271-295.

Primary Examiner—Rebecca L. Rudolph
Attorney, Agent, or Firm—Fliesler, Dubb, Meyer and Lovejoy

[57] ABSTRACT

In a watchdog timer, the selected codes identifying the format of a watchdog timer algorithm, such as the intervals within which a watchdog timer status must be issued by the host processor, are supplied as hardwired preset codes in programmable fuse or read only memory cells that are adapted to be programmed, but are immune from ESD, power glitches and errant software. A programmable code indicating a programmable time interval is also stored in a register protected from errant software when the watchdog timer is enabled. A selector receives the preset code and the programmable code and selects an output code indicating the time interval within which the watchdog timer must be reset by a processor status signal. The selector can be programmed to select only the preset code by supplying a selector control signal through an element that is immune from electrostatic discharge, power glitches and errant software. Also, a code fixing the watchdog timer in an on state can be supplied with ESD-immune cells. The watchdog timer employs a keyed sequence for the watchdog timer status signal.

34 Claims, 10 Drawing Sheets

RELIABLE WATCHDOG TIMER

CROSS-REFERENCE TO RELATED APPLICATION

This application is a continuation of application SC/Ser. No. 07/174,754, which was filed Mar. 29, 1988, now abandoned.

BACKGROUND OF THE INVENTION

1. Field of the Invention

The present invention relates to status timers for detecting abnormal behavior in real time processors or microcontrollers and, in particular, to apparatus for improving the reliability of such timers.

2. Description of Related Art

Processors commonly used for real time controller applications, such as the Intel 8096, Intel 80C252, Siemens 80515, and NEC 7811, employ an apparatus known as a watchdog timer. The watchdog timer is a status timer which must be reset by the processor within a selected time period. If the processor does not reset the watchdog timer, abnormal operation of the processor is assumed. In this case, the watchdog timer generates a reset signal for its host processor.

The selected period within which the processor must reset the watchdog timer is stored in registers or latches in prior art systems in response to program control of the host processor. The contents of the register or latch holding the code indicating the selected time interval is compared continuously with the output of a counter. When the counter reaches the threshold value, a reset signal is generated. Problems arise in maintaining correct operation of the watchdog timer during or after an electrostatic discharge (ESD), power glitches, or errant software. Because the code which indicates the interval within which the watchdog timer must be reset, is stored in registers or latches, ESD and power glitches can cause changes in the preselected code, interfering with normal operation of the watchdog timer. Also, because those storage elements are accessible by software control of the processor, errant software can alter the preselected code as well.

Because microcontrollers or processors used for real time control applications are often employed in harsh environments, a need arises for watchdog timers that are immune from ESD, power glitches and errant software.

SUMMARY OF THE INVENTION

The present invention provides a watchdog timer with increased reliability and flexibility. In particular, the selected codes identifying the format of a watchdog timer algorithm, such as the intervals within which watchdog timer status signals must be issued by the host processor, are supplied by fuse cells or read only memory cells adapted to be programmed by a designer or user to provide hardwired signals that are immune from ESD, power glitches and errant software.

The watchdog timer according to the present invention comprises a circuit element for supplying a preset code indicating a preset time interval immune from ESD, power glitches and errant software. In addition, a programmable code indicating a programmable time interval is stored in software-accessible registers or latches. A selector receives the preset code and the programmable code and selects an output code indicating the time interval within which the watchdog timer must be reset by a processor status signal. The timer receives the processor status signal and generates a timer code indicating an elapsed time since the last receipt of the status signal. A comparator receives the output code and the timer code and generates a processor reset signal when the elapsed time indicated by the timer code exceeds the time interval indicated by the output code. The selector can be programmed to select only the preset code by supplying a selector control signal through an element that is immune from electrostatic discharge, power glitches and errant software.

In another aspect of the invention, the watchdog timer can be fixed on by supplying a preset enable signal through an element immune from electrostatic discharge, power glitches and errant software.

In yet another aspect of the invention, the status signal generated by the host processor is a keyed sequence having a first key and a second key. The processor writes the first key to the watchdog timer which includes a means responsive to the first key for entering a state that watches for the second key. If the second key follows the first key the watchdog timer resets its internal timer. If the processor follows the first key with a key sequence containing data not equal to the first key or the second key, the watchdog timer will issue a reset as if timer overflow had occurred.

Further, in one aspect of the invention, the host processor includes a reset pin through which a hardware reset can be signalled to the processor from the outside. In this embodiment, the watchdog timer reset signal is supplied to the hardware reset input pin through a pseudo-bidirectional driver that allows the host processor to discriminate between a reset pulse from the outside and the reset pulse generated by the watchdog timer.

Other aspects and advantages of the present invention can be understood by studying the drawings, specification and claims.

DESCRIPTION OF THE PREFERRED EMBODIMENT

The preferred embodiment of the present invention is described in detail with reference to the figures.

First, a system overview is provided. Next, detailed logic diagrams of the preferred implementations of the watchdog timer are reviewed.

I. System Overview

Figure 1:
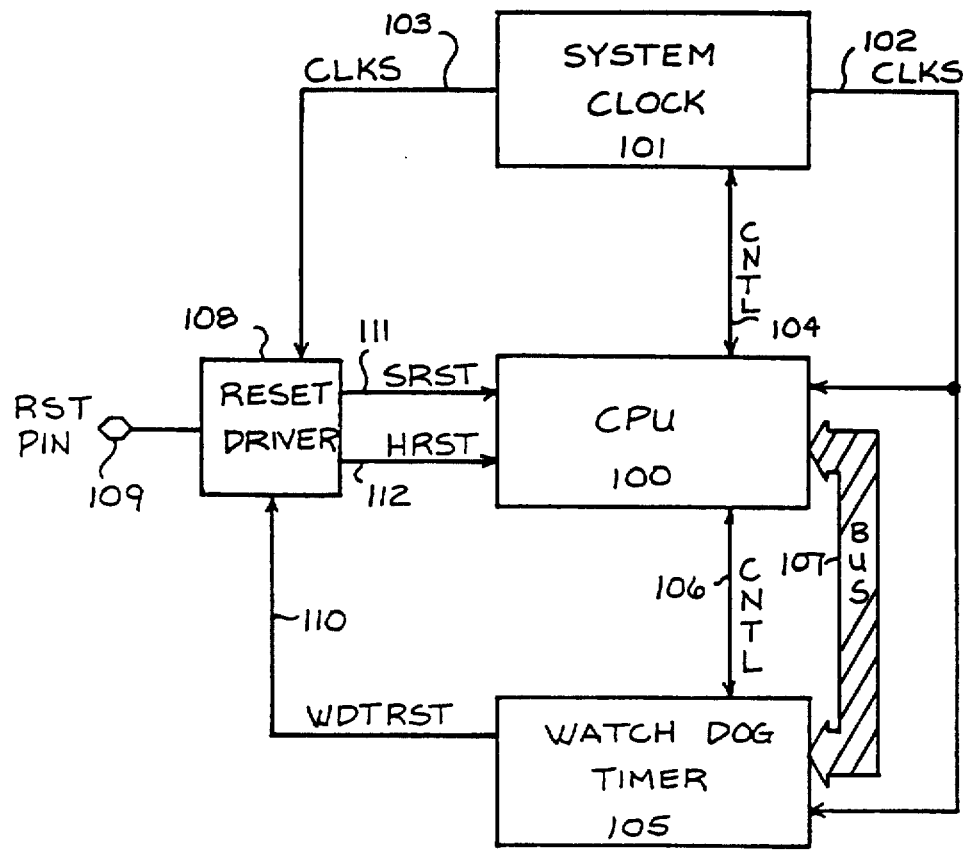
FIG. 1 is a block diagram of a processor employing the present invention.

FIG. 1 is a block diagram of a processor employing the present invention. The processor includes a CPU 100 that performs standard microcontroller or microcomputer processes under program control. In addition, a system clock 101 generates clock signals CLKS on lines 102 and 103 for supply throughout the system. The CPU 100 in the preferred embodiment, is a data processor operating with a six-state instruction cycle and a two-phase clock. This system clock feature is reflected in the detailed implementation set out below with reference to FIGS. 2-9. The CPU 100 and system clock 101 communicate control information CNTL across line 104.

The processor of FIG. 1 includes a watchdog timer 105 according to the present invention. The watchdog timer 105 receives system clocks across line 102 and communicates control information CNTL with the CPU 100 across line 106. In addition, a bus 107 is provided for communicating data between the CPU 100 and the watchdog timer 105 in response to the control information CNTL on line 106.

Finally, the processor includes a reset driver 108 connected to an input/output pin 109 which is adapted to receive an externally generated reset signal. The reset driver also receives a watchdog timer reset signal WDTRST on line 110 from the watchdog timer 105. The system clock is provided on line 103 to the reset driver 108. The outputs of the reset driver 108 include a software reset signal SRST on line 111 and a hardware reset signal HRST on line 112. CPU 100 reacts differently to the soft reset from line 111 than it does to the hard reset on line 112. The differences between these resets are well understood in the art.

In operation, the watchdog timer stores a code indicating an interval of time within which the CPU must generate a status signal. The status signal is provided to the watchdog timer 105 across bus 107 under program control from the CPU 100. If the status signal is not generated within the interval, the watchdog timer reset signal WDTRST is supplied on line 110 to the reset driver 108.

II. Watchdog Timer Block Diagram

Figure 2:
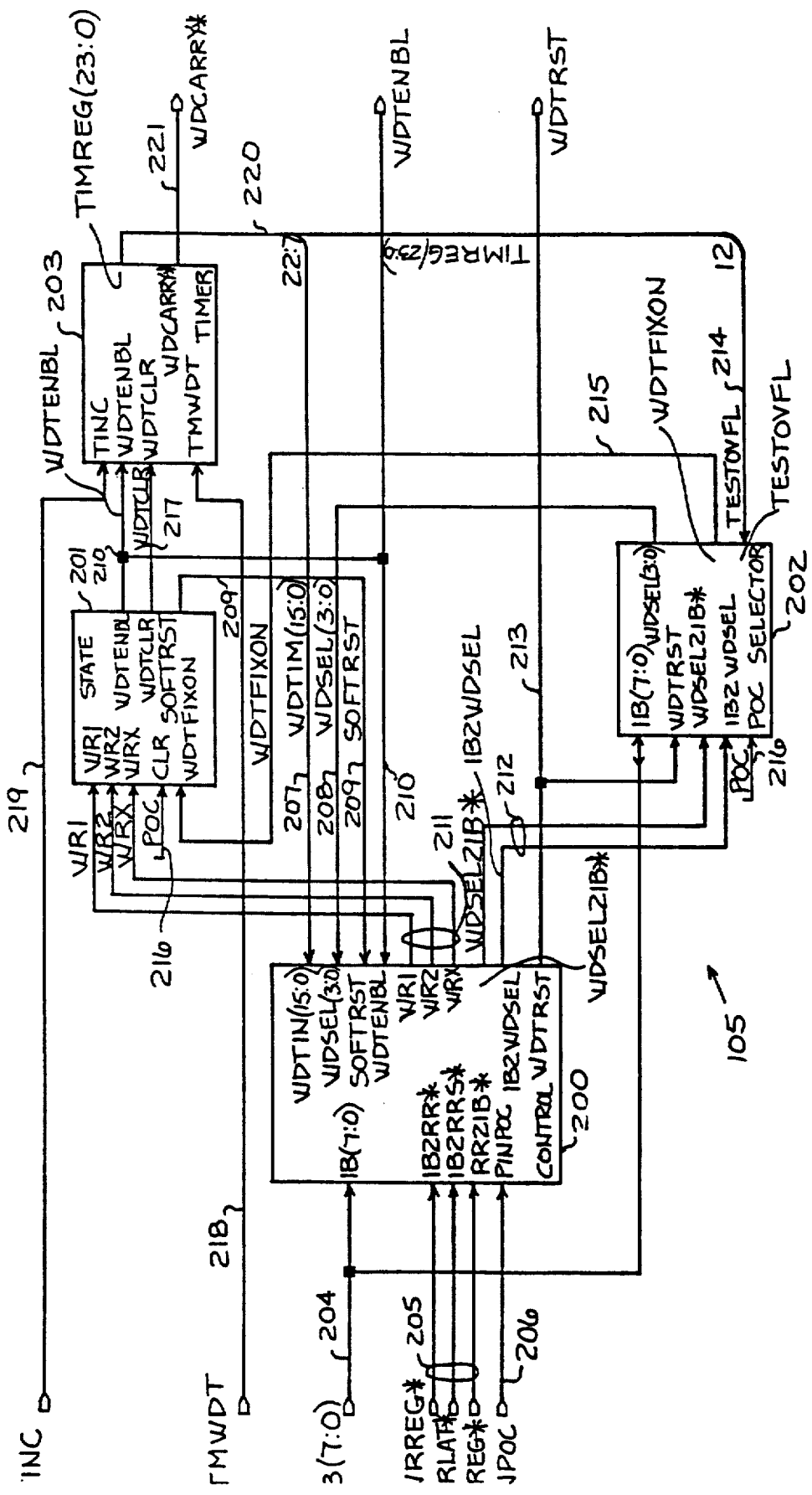
FIG. 2 is a block diagram of the watchdog timer according to the present invention.

FIG. 2 is a block diagram of the watchdog timer 105 in the preferred embodiment of the present invention. The watchdog timer 105 includes a control block 200 providing an interface to the host internal bus, and providing a comparator for comparing the output of the internal timer of the watchdog timer and the selected interval code. In addition, the watchdog timer 105 includes a state machine 201 used for decoding keyed sequence status signals from the host processor. A third element of the watchdog timer 105 is a selector 202 which provides means for selecting either a programmable code received from the internal bus of the processor or a read only preset code from within the selector for supply as the interval code to the controller. Finally, the watchdog timer 105 includes a timer block 203 which provides the interval timing information for the watchdog timer 105.

The inputs to the watchdog timer control block 200 include the internal bus IB(7:0) from line 204, a number of addressing control signals 205, including WRREG*, ADRLAT*, and RDREG*. The WRREG* is a control signal indicating a write from the internal bus to an addressed register. The ADRLAT* controls when to latch the address from the IB(7:0) lines for subsequent decoding. The RDREG* signal is used in controlling a read from the addressed register to the internal bus. The * at the end of signal names indicates that the signal is active LOW.

The control block 200 also receives the power-on clear signal PINPOC from the reset pin on line 206. This signal is a staged version of the hardware reset signal supplied at the reset pin 109.

The control block 200 receives the output WDTIM(15:0) across line 207 from the timer 203. The interval code WDSEL(3:0) is supplied on line 208 to the control 200 from the selector 202. Finally, the control block 200 receives the SOFTRST signal across line 209 and a WDTENBL signal across line 210 from the state machine 201.

The outputs of the control block 200 include the state machine control signals, WR1, WR2, WRX on lines 211, selector control signals WDSEL2IB* and IB2WDSEL on lines 212 and a WDTRST signal on line 213.

Figure 9:
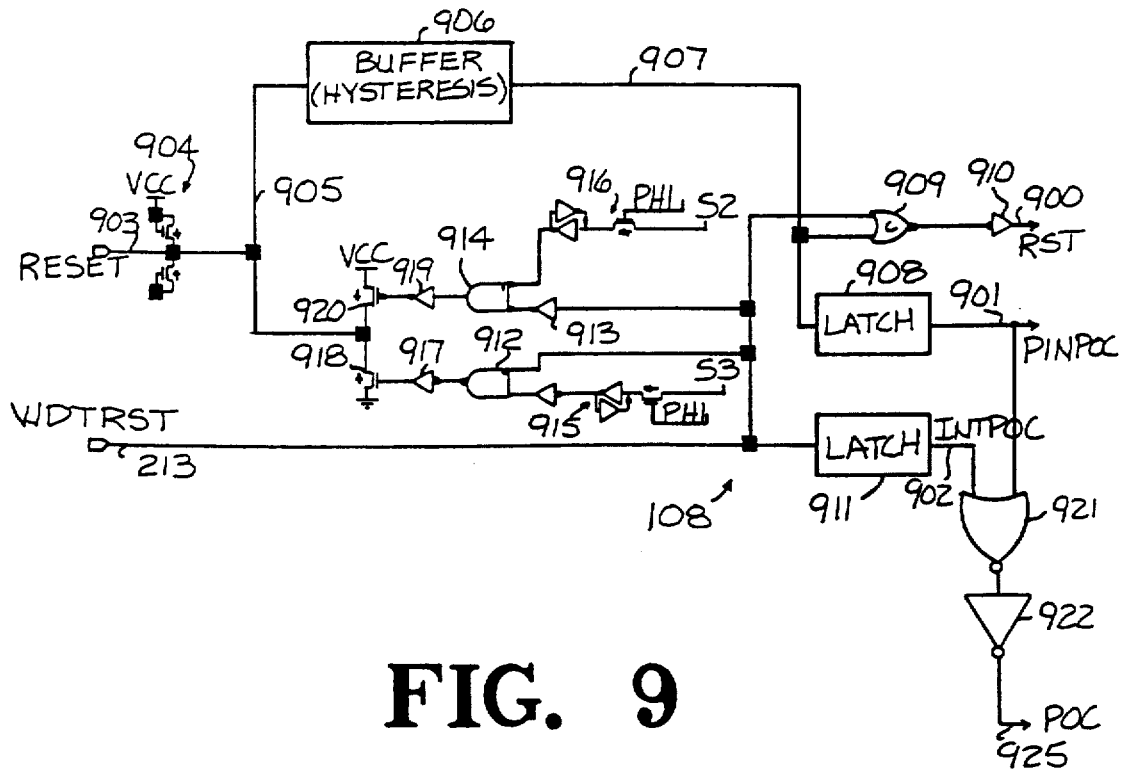
FIG. 9 is a logic diagram of the reset driver shown in FIG. 1.

The selector 202 includes registers that may be written and read via the internal bus 204. The control signals on lines 212 provide the timing information required for those accesses. The selector 202 also receives the WDTRST signal on line 213 from the control block 200 and a testing signal TSTOVFL on line 214 from timer 203. The selector 202 receives a POC signal on line 216 which is generated as shown in FIG. 9 to indicate a power-on clear signal generated in response to a soft reset, watchdog timer reset or an external pin reset. The outputs of the selector 202 include the selected interval code WDSEL(3:0) on line 208 and a fixed-on signal WDTFIXON on line 215.

The state machine 201 receives the state machine control signals on lines 211 and the WDTFIXON signal from line 215. In addition, it receives as input the power-on clear signal POC from line 216.

The state machine 201 generates an enable signal WDTENBL on line 210, a clear signal WDTCLR on line 217 and a software reset signal SOFTRST on line 209.

The timer 203 receives the enable signal WDTENBL on line 210 and the clear signal WDTCLR on line 217 from the state machine. In addition, a test mode signal TMWDT from line 218 is supplied to the timer 203. Finally, a clock signal TINC on line 219 is supplied to the timer 203 from the system clock 101.

The timer 203 generates an output TIMREG(23:0) indicating a lapsed time since the previous receipt of WDTCLR on line 217. This output is supplied on line 220, bits 22-7 being supplied as WDTIM(15:0) on line 207 and bit 12 being supplied as TESTOVFL on line 214. Finally, the timer 203 generates a carry signal WDTCARRY* on line 221.

A. Watchdog Timer Control 200 (FIGS. 3 and 4)

Figure 3:
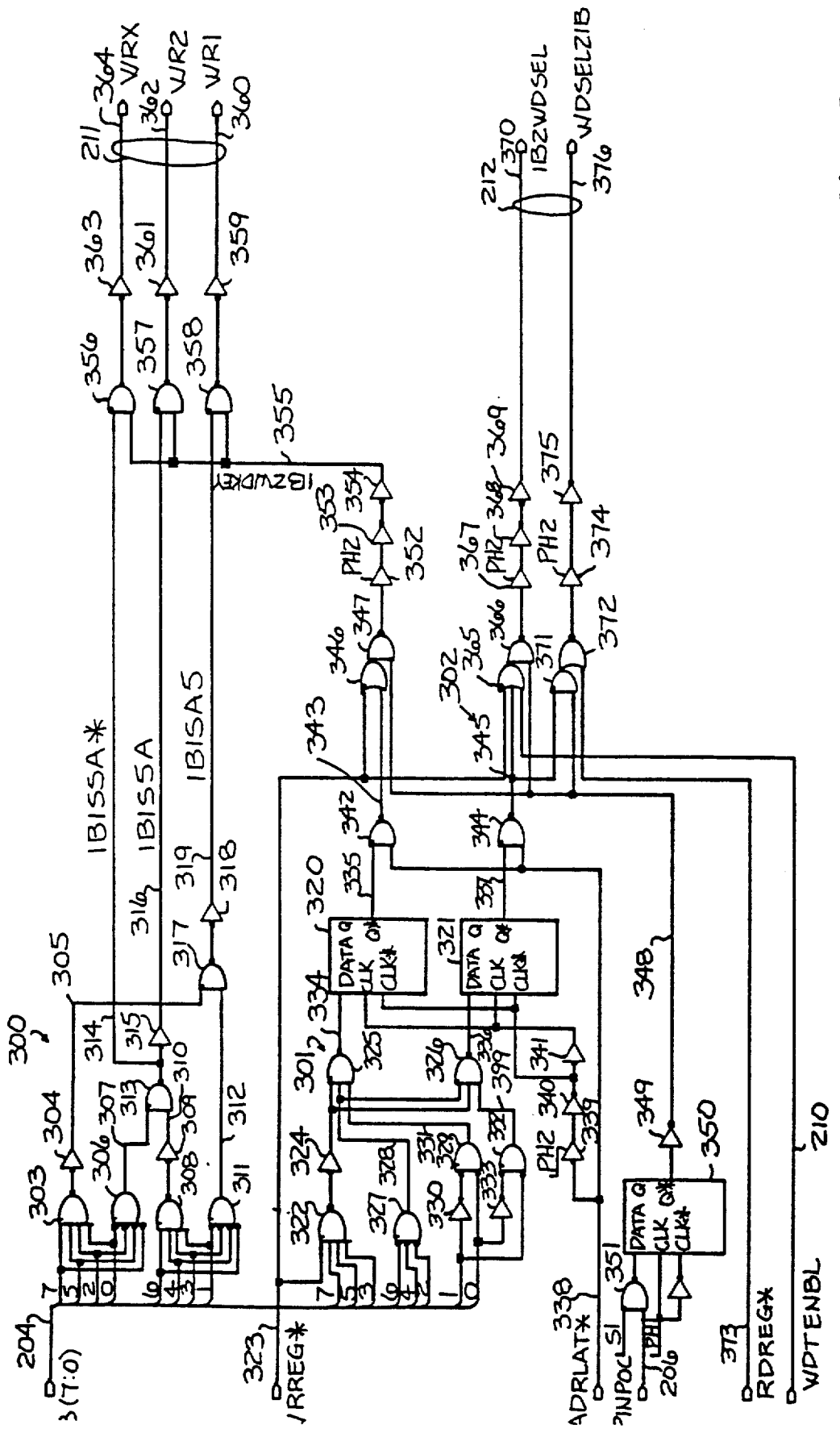
FIGS. 3 and 4 are logic diagrams of the watchdog timer control block from FIG. 2.
Figure 4:
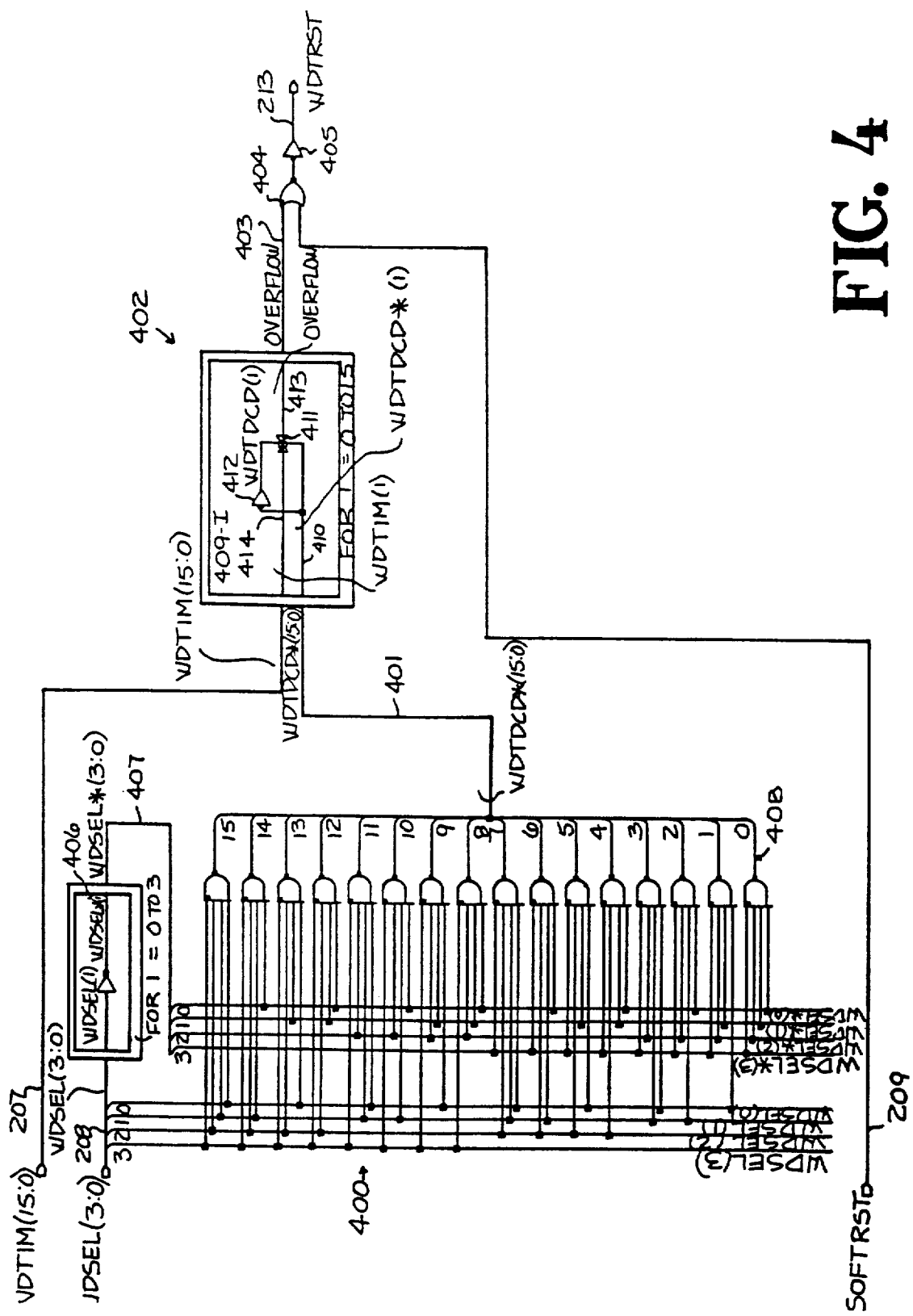

FIGS. 3 and 4 are a logic diagram of the control block 200 of the watchdog timer 105. FIG. 3 illustrates the generation of the state machine control signals on lines 211 and the watchdog timer select addressing signals on lines 212. FIG. 4 illustrates the generation of the watchdog timer reset signal WDTRST on line 213.

In FIG. 3, a means for generating the state machine control signals 211 is included. The means includes a data decoder 300 for detecting the keys written to the internal bus and an address decoder 301 for detecting the distinct address for a write to the watchdog timer key. In addition, the address decoder 301 detects reads and writes to the watchdog timer select register for the generation of the control signals on lines 212. An enabling means 302 is included, responsive to the watchdog timer enable signal WDTENBL on line 210, for enabling the generation of the select register access control signals on lines 212.

The data decoder 300 includes NAND-gate 303 which is connected to receive bits 0, 2, 5 and 7 from the internal bus 204. The output of NAND-gate 303 is supplied through inverter 304 to line 305. In addition, NOR-gate 306 is included in the decoder 300 which receives bits 0, 2, 5 and 7 from the internal bus, and generates an output on line 307. The decoder 300 includes NAND-gate 308 which receives bits 1, 3, 4 and 6 of the internal bus 204 and supplies its output through inverter 309 to line 310. In addition, NOR-gate 311 receives bits 1, 3, 4 and 6 from the internal bus 204, and supplies its output on line 312. Lines 307 and 310 are supplied as inputs to NAND-gate 313. The output of NAND-gate 313 is supplied on line 314 as an IBIS5A* signal active low, indicating that the data on the internal bus is 5A (0101-1010). The IBIS5A* signal on line 314 is supplied through inverter 315 as IBIS5A to line 316 which is an active high version of the signal on line 314.

The signals on lines 305 and 312 are supplied through NAND-gate 317 which supplies its output as IBISA5 through an inverter 318 to line 319. The IBISA5 signal on line 319 indicates when the data on the internal bus is A5 (1010-0101).

The address decoder 301 detects an access to the watchdog timer key and stores a code indicating that access in register 320, and detects a read or write to the watchdog timer select register and stores a code indicating that read or write in register 321. The decoder 301 includes NAND-gate 322 which receives bits 3, 5, and 7 from the internal bus 204 and the WRREG* signal on line 323. The output of the NAND-gate 322 is supplied through inverter 324 as an input to NAND-gate 325 and as an input to NAND-gate 326. The decoder 301 also includes NOR-gate 327 which receives bits 2, 4, and 6 of the internal bus and supplies its output on line 328 as inputs to NAND-gates 325 and 326. In addition, NOR-gate 329 in the decoder 301 receives the output of inverter 330 which is connected to receive bit 1 from the internal bus. The other input to NOR-gate 329 is bit 0 from the internal bus. The output of NOR-gate 329 is supplied on line 331 as an input to NAND-gate 325.

NOR-gate 332 in the decoder 301 receives bit 1 from the internal bus and the output of inverter 333 which is connected to receive bit 0 from the internal bus. The output of the NOR-gate 332 is supplied on line 399 as an input to NAND-gate 326. The output of NAND-gate 325 is supplied on line 334 to the data input of register 320. The inverted output, Q*, of register 320 is supplied on line 335 indicating that the address on the internal bus calls for an access to the watchdog timer key.

The output of NAND-gate 326 is supplied on line 336 as the data input to register 321. The inverted output Q* of register 321 is supplied on line 337 indicating that the address from the internal bus calls for a read or a write of the watchdog select register.

Registers 320 and 321 are clocked by the ADRLAT* signal on line 338 during phase 2 of the system clock. This is accomplished by supplying the signal on line 338 through phase 2 gated clock driver 339. The output of the gated clock driver 339 is supplied through inverter 340 as the inverted clock input to registers 320 and 321 and as an input to inverter 341. The output of inverter 341 is supplied as the non-inverted clock inputs to registers 320 and 321.

In addition, the signal on line 338 and the signal on line 335 are supplied through NAND-gate 342. NAND-gate 342 serves to pass the output of register 320 to its output when the ADRLAT* signal on line 338 is high, supplying an inverted version of the signal on line 335 on line 343.

The signal on line 337 and the signal on line 338 are also supplied to NAND-gate 344 which serves to pass the signal on line 337 through its output on line 345 when ADRLAT* is high.

The signal on line 343 is asserted to indicate a read or write to the watchdog timer key. It is supplied as a first input to the OR-function of complex gate 346/347. A second input to the OR-function (346) of this gate is the WRREG* signal on line 323. The output of the OR-function will be high when WRREG* is active low only if the signal on line 343 is high, indicating an address decode for the watchdog timer key. The output of the OR-function is supplied to the NAND-function (347) of complex gate 346/347. The second input to the NAND-function is a signal on line 348 from the output of inverter 349. The input to inverter 349 is the inverse output Q* of register 350. Register 350 serves to latch the PINPOC signal through NAND-gate 351. The second input to NAND-gate 351 is the state 1 clock S1 from the system clock. The output of NAND-gate 351 is the data input to the register 350. Register 350 is clocked by the phase 1 clock PH1 from the system clock and the inverted phase 1 clock.

The NAND-function of complex gate 346/347 will invert the output of the OR-function provided no PINPOC signal is asserted during stage 1 of the instruction generating the address signal. The output of complex gate 346/347 is supplied through a phase 2 gated clock driver 352 and from there through inverters 353 and 354. The output of inverter 354 is the IB2WDKEY signal on line 355.

The IB2WDKEY signal on line 355 is supplied as one input to each of NAND-gates 356, 357 and 358. NAND-gate 356 receives as its second input the IBIS5A* signal on line 314. NAND-gate 357 receives as its second input the IBIS5A signal on line 316 and the NAND-gate 358 receives as its second input the IBISA5 signal on line 319.

The output of NAND-gate 358 is supplied through inverter 359 as the WR1 signal on line 360. WR1 is asserted to indicate that the written key is A5. The output of NAND-gate 357 is supplied through inverter 361 as the WR2 signal on line 362. The WR2 signal indicates that the key written to the watchdog timer key is 5A. The output of NAND-gate 356 is supplied through inverter 363 as the WRX signal on line 364. The WRX signal indicates that the key written is other than 5A.

The output of NAND-gate 344 on line 345 indicates that the address decode indicates a write or a read to the watchdog select register. The signal on line 345 is supplied as a first input to the OR-function of complex gate 365/366. The second input to the OR-function (365) is the WRREG* signal on line 323. A third input to the OR-function 365 is the WDTENBL signal on line 210. Thus, the output of the OR-function to the complex gate will pass the signal on line 345 if the active high watchdog timer enable signal WDTENBL on line 210 is low and the active low WRREG* signal is low. The output of OR-function 365 is supplied through the NAND-function of complex (366) gate 365/366. The second input to the NAND-function is the signal on line 348 which forces the output high during a pin power-on clear. The output of complex gate 365/366 is supplied through a phase 2 gated clock driver 367, inverter 368 and inverter 369 as the IB2WDSEL signal on line 370.

The signal on line 345 is also supplied as input to the AND-function of complex (371) gate 371/372. The second input to AND-function is the signal on line 348 which forces the output of the AND-function low during power-on clear from the pin. The output of AND-function is supplied as a first input to NOR-function 372 of complex gate 371/372. The second input to NOR-function 372 is the RDREG* signal on line 373. The output of complex gate 371/372 is supplied through a phase 2 gated clock driver 374 and inverter 375 as the WDSEL2IB* signal on line 376.

FIG. 4 illustrates the generation of the WDTRST signal on line 213. The logic shown in FIG. 4 includes a decoder 400 that decodes the WDSEL(3:0) signal to generate a 16-bit decode WDTDCD*(15:0) on bus 401. In addition, multiplexer 402 as shown in FIG. 4, passes the appropriate one signal of WDJIN(15:0) from bus 207 according to which one signal of WDTDCD*(15:0) from bus 401 is asserted low. The output of the multiplexer 402 is an overflow signal on line 403 which is supplied as a first input to NOR-gate 404. The second input to NOR-gate 404 is the SOFTRST signal from line 209 generated by the state machine 201. The output of the NOR-gate is supplied through inverter 405 as the WDTRST signal on line 213.

The decoder 400 receives the WDSEL(3:0) signal from the selector 202 across bus 208. It is supplied to an array 406 of inverters, one for each bit of WDSEL(3:0) to generate the inverse code WDSEL*(3:0) on bus 407. The WDSEL(3:0) signals on bus 208 and WDSEL*(3:0) on bus 407 are supplied to NAND-array 408. The output of the NAND-array 408 is a 16-bit active low decode WDTDCD* (15:0) of the 4-bit WDSEL code. As can be determined from FIG. 4, the NAND-array 408 performs a straight binary decode of the WDSEL code such that only a single bit in the output is low for a given WDSEL code.

The multiplexer 402 includes a plurality of transceivers 409, each of which are connected to receive a respective bit I from the decode on line 401, indicated WDTDCD*(I) on line 410, and a respective bit I from the output of the watchdog timer WDTIM(15:0) indicated WDTIM(I) on line 414, for I=0 to 15. The decode bit supplied on line 410 is connected as the enable signal, active low, for pass gate 411. In addition, it is connected through inverter 412 as an active high enable for the pass gate 411. Accordingly, when the decode bit on line 410 is low, the bit WDTIM(I) is supplied through as the OVERFLOW signal on line 403. Otherwise, the output of the transceiver 411 is tri-stated. The OVERFLOW signals 413 for each cell, I, are wired together to generate the OVERFLOW signal 403. Accordingly, if the selected WDTIM is asserted high, the signal on line 403 will be high, causing a WDTRST assertion on line 213.

B. Watchdog Timer Selector 202

Figure 5:
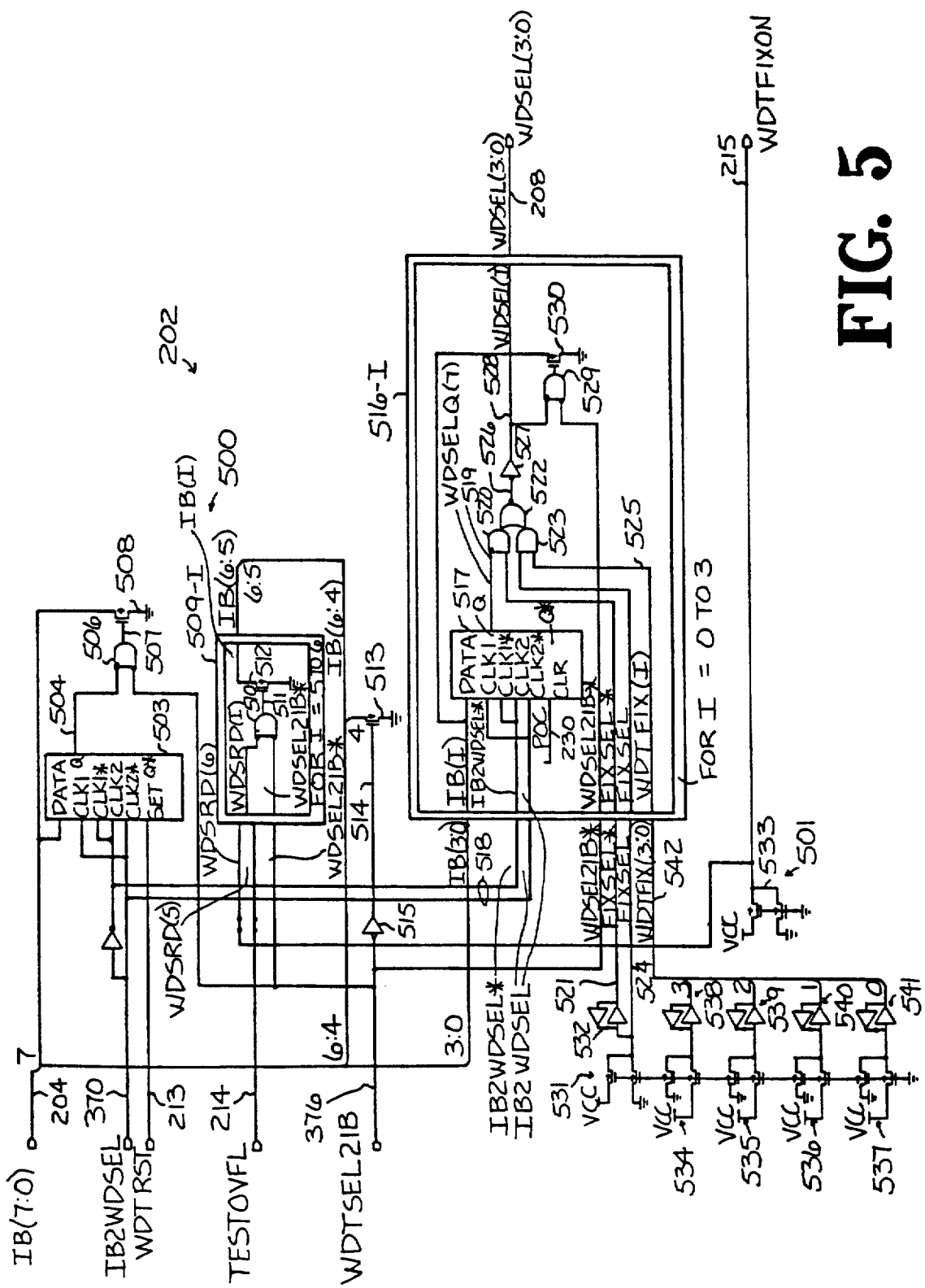
FIG. 5 is a logic diagram of the watchdog timer select block of FIG. 2.

FIG. 5 illustrates the logic diagram of the watchdog timer selector 202. Watchdog timer selector 202 includes a register array 500 that can be accessed through the internal bus 204 in response to the IB2WDSEL signal on line 370 and the WDSEL2IB* signal on line 376. The register array 500 stores a programmable code WDSELQ(3:0) that can be selected as the WDSEL(3:0) signal on bus 208. The register array 500 also serves as a storage cell providing watchdog timer status information to the host processor.

Figure 10:
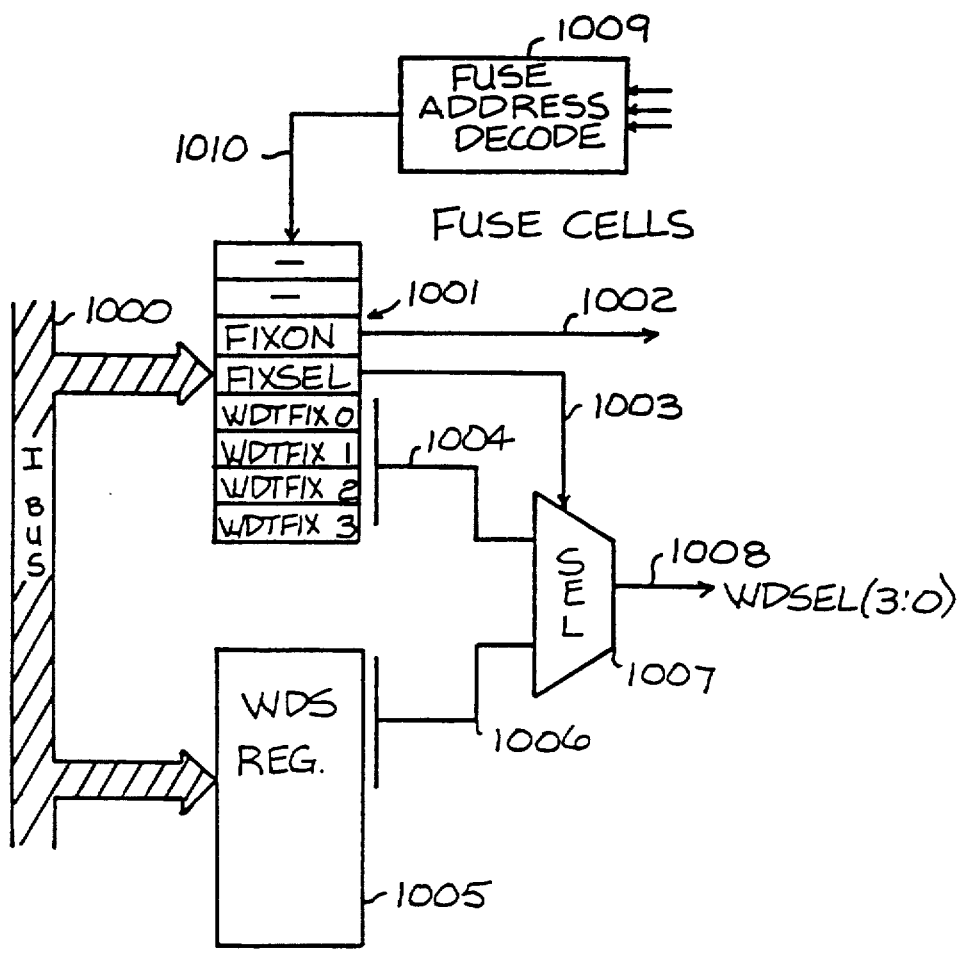
FIG. 10 is a block diagram of an alternate embodiment of the watchdog timer select block of FIG. 2, employing fuse cells.

In addition, the selector 202 includes a ROM cell array 501 that is adapted to be programmed by a user or designer, which supplies a hardwired preset code WDTFIX(3:0) that can be selected as the WDSEL(3:0) signal on bus 208. In addition, the ROM cell array 501 includes a cell 531 for supplying a watchdog timer selector control bit FIXSEL, and a cell 533 for the WDTFIXON bit on line 215. These ROM cells are hardwired transistors after programming to indicate time-value and option selection by a designer. Thus, the cells are immune from power surges, electrostatic discharge and errant software, in order to protect the operation of the watchdog timer. They are implemented as depletion implant mask programmable transistors. An alternative embodiment using a fuse cell array is shown in FIG. 10 and will be discussed below.

Finally, the watchdog timer selector 202 includes selector 502 for selecting from the hardwired time-value WDTFIX(3:0) or the value written across the internal bus WDSELQ(3:0) for supply as WDSEL(3:0) signal on bus 208.

The register array 500 includes first, a register 503 which is connected to receive bit 7 of the internal bus 204 at its data input. It is clocked by the IB2WDSEL signal on line 370 and its inverse. The register 503 includes a set input connected to the WDTRST signal on line 213, so that its output is set high during a watchdog timer reset. The output is supplied on line 504 where it is received through a NOR-gate 506. A second input to NOR-gate 506 is the WDSEL2IB* signal from line 376. The output of NOR-gate 506 is supplied on line 507 as a control input to the pulldown transistor 508. When the WDSEL2IB* signal is asserted low, and the value on line 504 is low, the pulldown transistor 508 is enabled to pull down bit 7 of the internal bus 204.

The register array 500 also includes two cells 509-I connected respectively to bits 6 and 5 of the internal bus. The cells 509-I allow a status read of the watchdog timer. Bit 6 of the internal bus is connected to receive the WDTFIXON signal on line 215 where it is supplied as WDSRD(6). Bit 5 of the internal bus is connected to receive the TSTOVFL signal on line 214 where it is connected as WDSRD(5). The cell 509-I includes NOR-gate 510 which receives WDSRD(I) and the WDSEL2IB* from line 376. The output of NOR-gate 510 is supplied on line 511 to enable pulldown transistor 512 in each of the cells 509-I.

Bit 4 of the internal bus is connected to pulldown transistor 513. Pulldown transistor 513 is enabled by the inverse of WDSEL2IB* as supplied on line 514 at the output of inverter 515. Therefore, the bits 7–4 of the internal bus can be read by the controlling program to determine the status of the watchdog timer.

Bits 3–0 of the internal bus IB(7:0) are supplied to the register array 516. These bits hold the programmable time value WDSELQ(3:0) when IB2WDSEL is asserted high, that can be selected for supply on bus 208 as the WDSEL(3:0) signal. The array 516 includes four cells 516-I, for I=0 to 3. Each cell includes a register 517 that can be written from the internal bus and a selector 502 for selecting the preset values from either the ROM array 501 or the programmable values. Accordingly, the internal bus bit IB(I), for I=0 to 3, is supplied as an input to a register 517. The register is clocked by IB2WDSEL and IB2WDSEL* on lines 518. The register is cleared by a power-on clear signal POC from line 230 that is generated as shown in FIG. 9.

The output of the register 517 is the WDSELQ(I) signal on line 519. The signal on line 519 is supplied as one input to AND-function 520 of complex gate 520/522/523. A second input to AND-function 520 is the FIXSEL* signal from line 521. The output of AND-function 520 is supplied as one input to NOR-function 522. The second input to NOR-function 522 is the output of AND-function 523. The inputs to AND-function 523 include the FIXSEL signal on line 524 and the WDTFIX(I) bit from line 525.

Therefore, depending on the state of the FIXSEL bit as indicated across lines 521 and 524, either WDSELQ(I) or WDTFIX(I) from the output of complex gate 520/522/523 is supplied on line 526 through inverter 527 to line 528 as WDSEL(I).

The selector 502 selects either the preset value from the ROM array 501 or the programmable value from the register array 500 for supply as the WDSEL(I) bit on line 528. The WDSEL(I) bit can be read across the internal bus 204 through NOR-gate 529. The signal on line 528 is supplied at one input of NOR-gate 529. The second input to NOR-gate 529 is the WDSEL2IB* signal. Therefore, during the assertion of the WDSEL2IB* signal, when WDSEL(I) is low, the pulldown gate 530 is enabled to pull down the corresponding bit on the internal bus 204.

The ROM array 501 includes six mask programmable depletion implant ROM cells. The first ROM cell 531 stores the FIXSEL signal for supply on line 524. The signal on line 524 is supplied through an inverting latch 532 as the FIXSEL* signal on line 521. The ROM cell array also includes the cell 533 which supplies the WDTFIXON signal on line 215. In addition, cells 534, 535, 536 and 537 supply the preset code time value for the selector 202. This value is supplied through inverting latches 538, 539, 540, 541 as the WDTFIX (3:0) signal on bus 542.

In the embodiment shown in FIG. 5, the FIXSEL signal on line 524 is stored in a ROM cell array 531. Therefore, the output of the selector 502 may be set during mask programming by programming the FIXSEL signal high (otherwise the output is determined by the data written to the WDSELQ bus). This allows a designer to disable the watchdog timer from selecting the programmable timer code from the registers 517. In alternative embodiments, the FIXSEL signal, could be provided dynamically under program control by the host processor, or from other dynamic sources. Likewise, the WDTFIXON bit on line 215 is provided in a ROM cell 533. An alternative embodiment could provide this control signal dynamically.

FIG. 10 illustrates yet another alternative embodiment 202A for the selector according to the present invention. In the embodiment 202A of FIG. 10, the fixed code WDTFIX(I) is stored in a fuse-programmable cell 1001 rather than a ROM cell. Likewise, the control bits WDTFIXON and FIXSEL are stored in the fuse-programmable cells. This would provide additional flexibility in programming the chip. Accordingly, in FIG. 10 as illustrated, the internal bus 1000 is connected to a fuse-programmable cell array 1001. Fuse cell array 1001 includes a cell for the WDTFIXON bit for supply on line 1002. In addition, it includes a cell for the FIXSEL signal for supply on line 1003. Finally, the fuse cell array 1001 includes four cells storing WDTFIX(3:0) for supply on bus 1004. Finally, the internal bus 1000 connects to the watchdog timer select register 1005 which is addressable under program control just as shown in FIG. 5. The outputs of the register 1005 are supplied on bus 1006 as one set of inputs to a selector 1007. The second set of inputs to the selector 1007 is the preset code from lines 1004. The selector is controlled by the FIXSEL bit on line 1003. The output of the selector 1007 is the WDSEL(3:0) signal on bus 1008.

The fuse-programmable cell array 1001 could be written using fuse write circuitry in widespread use in programmable logic devices. Accordingly, the host processor would include a fuse address decoder 1009. The output of the fuse address decoder 1009 would decode the occurrence of a write to the fuse cell array 1001 across line 1010. Data could be written to the fuse cell array 1001 across internal bus 1000.

C. Watchdog Timer State Machine 201

Figure 6:
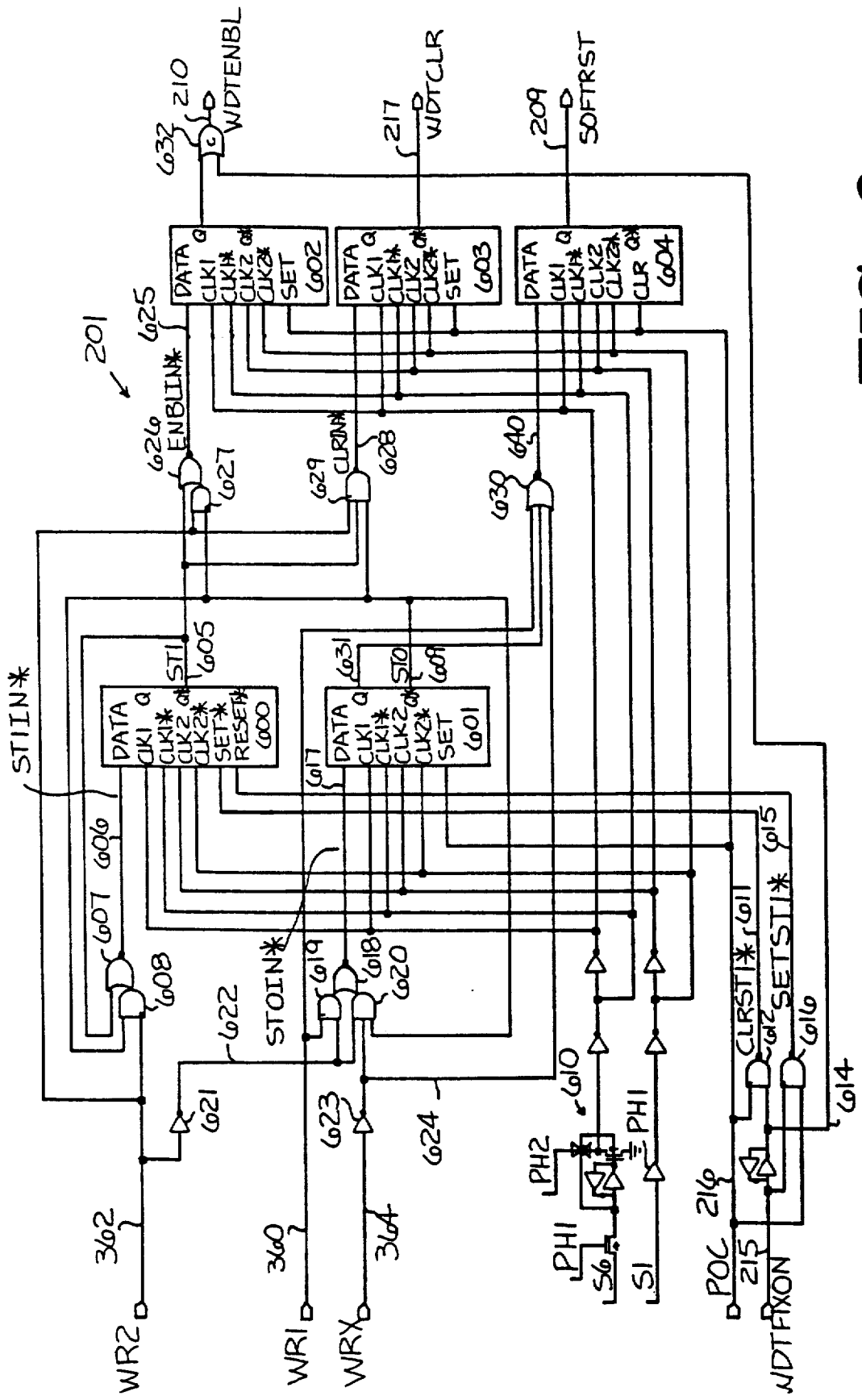
FIG. 6 is a logic diagram of the watchdog timer state machine of FIG. 2.

FIG. 6 is a logic diagram of the state machine 201 of the watchdog timer. The state machine 201 generates the WDTENBL signal on line 210, the WDTCLR signal on line 217 and the SOFTRST signal on line 209. The inputs to the state machine include the WRX signal on line 364, the WR1 signal on line 360 and the WR2 signal on line 362 which make up the state machine control signals 211. In addition, the POC signal on line 216 and the WDTFIXON signal on line 215 are supplied as inputs to the state machine 201.

The state machine 201 includes two state registers 600 and 601, and three output registers 602, 603 and 604. State register 600 generates the ST1 signal at its inverse output 605. State register 601 generates the ST0 signal at is inverse output 609. The data input to state register 600 is the ST1IN* signal on line 606. The signal on line 606 is generated at the output of the NOR-function (607) of complex gate 607/608 which receives as one input the ST1 signal on line 605 and as a second input the output of the AND-function (608) of the complex gate 607/608. The inputs to AND-function 608 include the ST0 signal which is generated on line 609 at the output of state register 601, and the WR2 signal from line 362.

Register 600 is clocked such that the input is sampled during phase 2 of state 6 of the pipeline, and the outputs switch on phase 1 of state 1 of the host processor, as can be seen with reference to the clock circuitry 610.

The register 600 is set by the CLRST1* signal asserted low on line 611 which is generated at the output of NAND-gate 612. The inputs to NAND-gate 612 include the POC signal from line 216 and the inverse of WDTFIXON supplied at the output of inverting latch 613 on line 614.

The register 600 is reset by the SETST1* signal asserted low on line 615, which is supplied at the output of NAND-gate 616. The inputs to NAND-gate 616 include the WDTFIXON signal on line 215 and the POC signal on line 216.

The state register 601 supplies the ST0 signal on line 609. The data input of register 601 is an ST0IN* signal on line 617 which is generated at the output of NOR-function 618 on complex gate 618/619/620. Inputs to NOR-function 618 include the output of AND-function 619 and the output of AND-function 620 from complex gate 618/619/620. Inputs to AND-function 619 include the WR1 signal on line 360 and the inverse of the WR2 signal from line 362 supplied through inverter 621 on line 622. The inputs to AND-function 620 include the inverse WR2 signal on line 622, the inverse of the WRX signal from line 364 supplied through inverter 623 to line 624 and the ST0 signal from line 609.

Register 601 is clocked by the same clock as register 600 in the sixth and first state of the host processor's instruction cycle. The set input to register 601 is the POC signal from line 216.

The ST1 signal on line 605 and the ST0 signal on line 609 in combination with the WR2 signal from line 362, are decoded to generate the ENBLIN* signal on line 625. The signal on line 625 is generated at the output of NOR-function 626 from complex gate 626/627. The inputs to NOR-function 626 include the ST1 signal from line 605 and the output of AND-function 627. Inputs to AND-function 627 include the WR2 signal from line 362 and the ST0 signal from line 609.

The ST1 signal on line 605, ST0 signal on line 609 and WR2 signal on line 362 likewise are decoded to generate the CLRIN* signal on line 628. The signal on line 628 is generated at the output of NAND-gate 629 which receives each of those signals as inputs. The output of the state register 601 is also used to generate a signal on line 640. The signal on line 640 is generated at the output of NOR-gate 630 which receives as inputs the WR1 signal on line 360, the inverse of ST0 from line 631 which is supplied at the non-inverting Q output of register 601, and the inverse of the WRX signal from line 624.

The ENBLIN* signal on line 625 is supplied as the data input to output register 602. The non-inverting Q output of register 602 is supplied as one input to NAND-gate 632, the output of which is the WDTENBL signal on line 210. The second input to NAND-gate 632 is the inverse of the WDTFIXON signal from line 614. Register 602 is clocked by the same clock as all the other registers in the state machine 201. It is set by the POC signal on line 216.

The CLRIN* signal on line 628 is supplied as a data input to output register 603. The inverting output of register 603 is the WDTCLR signal on line 217. Register 603 is clocked by the same clock as the other registers and set by the POC signal on line 216.

The signal on line 640 is supplied as a data input to output register 604. The non-inverting Q output of register 604 is the SOFTRST signal on line 209. Register 604 is clocked by the same clock as the other registers and includes a clear input which is connected to the POC signal on line 216.

Figure 11:
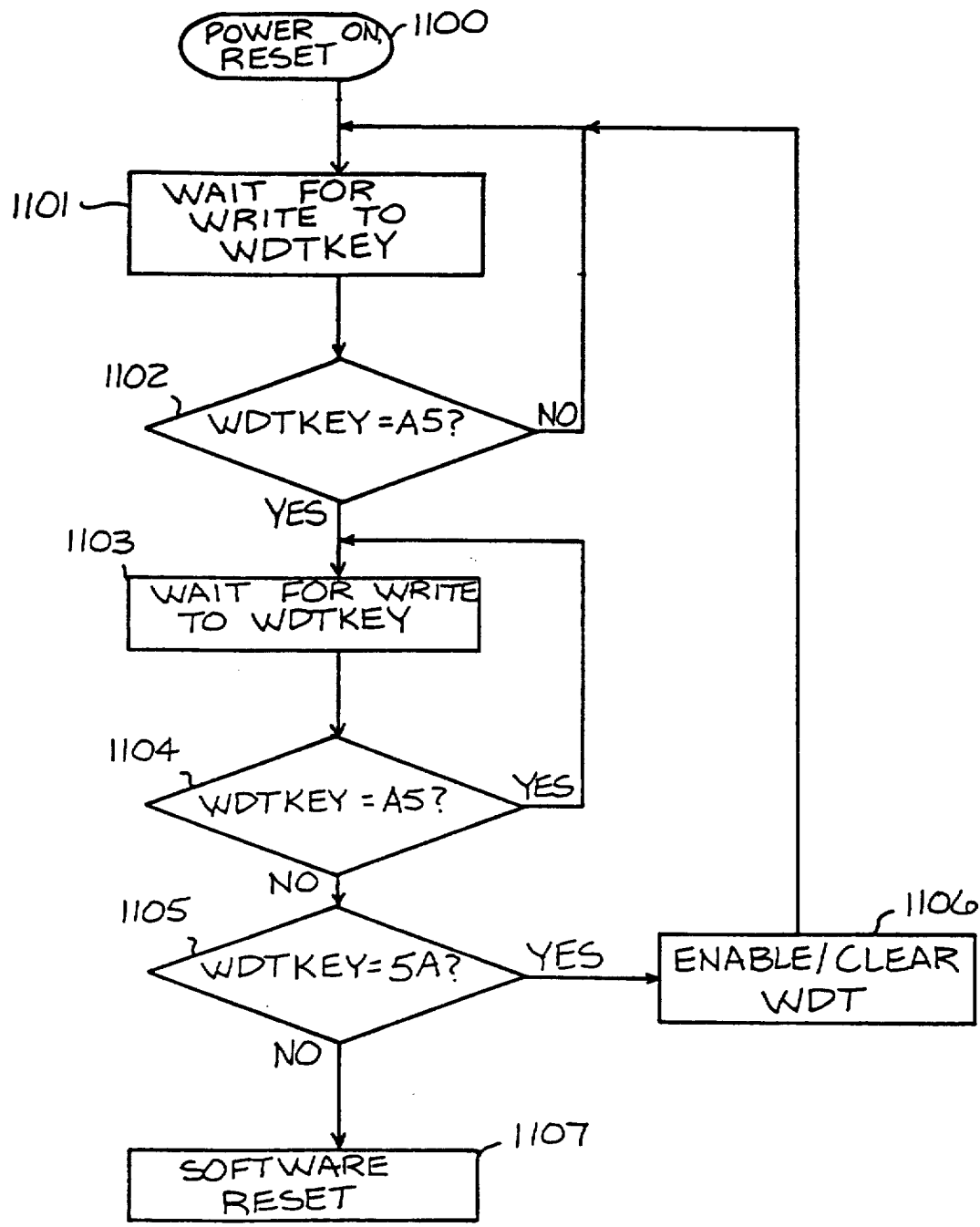
FIG. 11 is a flow chart illustrating operation of the state machine of FIG. 6.

The state machine in FIG. 6 implements the generalized flow chart shown in FIG. 11. The flow chart shown in FIG. 11 starts with a power-on or any kind of reset, that is a hardware, software or watchdog timer reset at block 1100. After such reset, the state machine waits for the write of A5 to the watchdog timer key register. This is carried out by waiting for a write to the WDTKEY register as indicated in control block 200 by the IB2WDKEY signal on line 355 (block 1101). After assertion of the IB2WDKEY signal on line 355, if the watchdog timer key is A5 (block 1102), then the state machine will wait for the second write to the watchdog timer key block 1103. The watchdog timer key is tested as indicated in block 1102 by detecting the WR1 signal on line 360 from the control block 200 shown in FIG. 3. If the watchdog timer key is not A5, the algorithm loops to block 1101 to wait for a subsequent write to the watchdog timer key.

After testing the watchdog timer key in block 1102, if the key is A5, the algorithm waits for a second write to the watchdog timer key (block 1103). The watchdog timer key is tested in block 1104 to determine whether it is equal to A5 as indicated by WR1. If it is equal to A5, the algorithm loops to block 1103. If it is not equal to A5, the key is tested to determine whether it is equal to 5A in block 1105 as indicated by the WR2 signal. If the key is 5A, the state machine will then generate the enable or clear signals for the watchdog timer in block 1106. If the key is not 5A as indicated by WRX from block 1105, the software reset signal is generated in block 1107.

D. Timer 203

Figure 7:
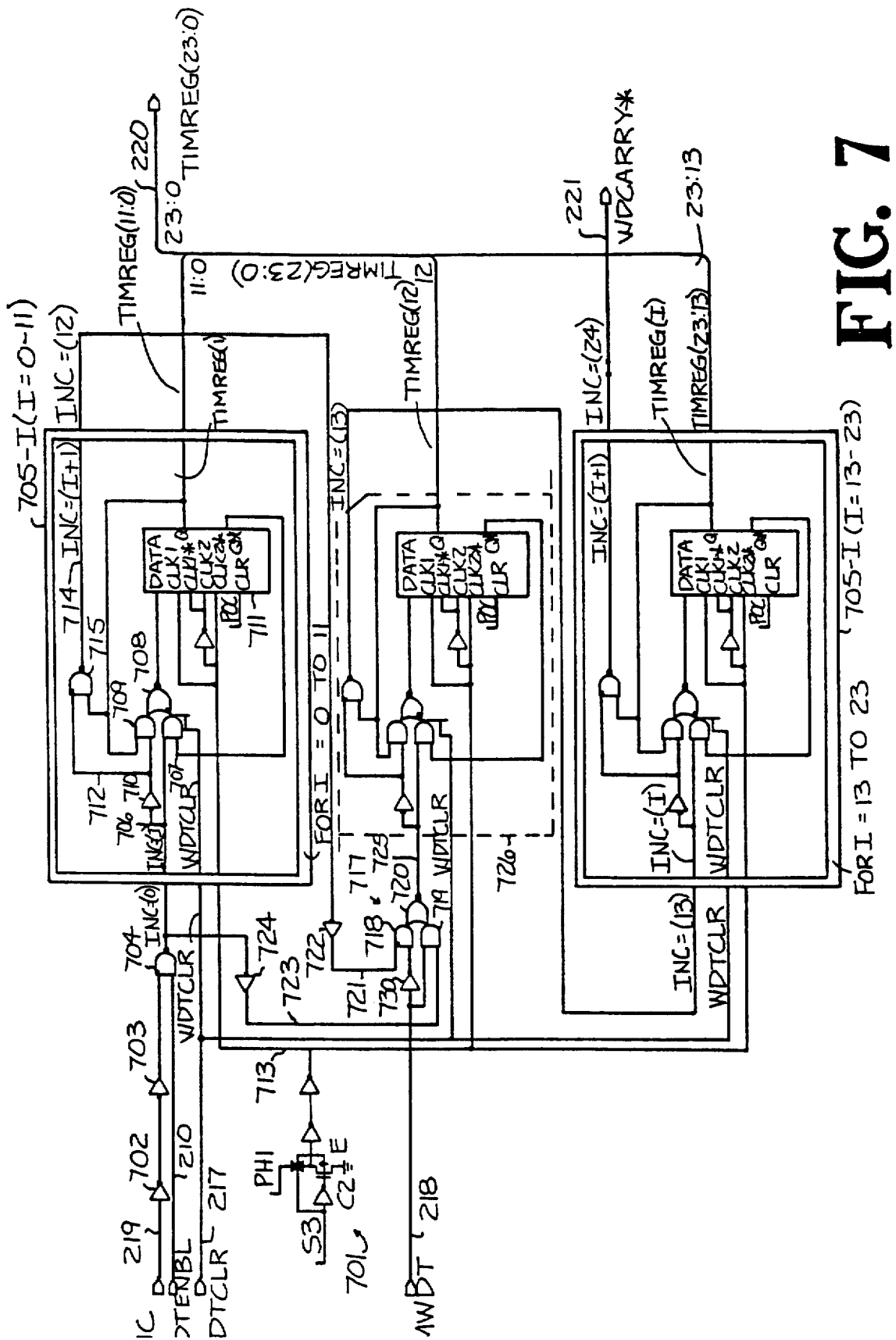
FIG. 7 is a logic diagram of the watchdog timer register of FIG. 2.

FIG. 7 is a logic diagram of the timer 203 for use in the watchdog timer a shown in FIG. 2. The timer 203 receives the increment signal TINC from the system clock across line 219. Other inputs to the timer include the watchdog timer enable signal WDTENBL from the state machine on line 210 and the watchdog timer clear signal WDTCLR from the state machine on line 217. Another input to the timer 203 is the test mode signal TMWDT on line 218. The outputs include a watchdog timer carry signal WDCARRY* on line 221 and the output of the 24-bit timer TIMREG(23:0) on bus 220.

The timer 200 includes 24 registers which are clocked in response to state 3 and phase 1 system clock signals as illustrated at 701.

The TINC signal is supplied through inverters 702 and 703 to the input of an enable gate 704. The enable gate 704 is a NAND-gate which receives as its second input the watchdog timer enable signal WDTENBL on line 210. The output of the NAND-gate 704 is the active low increment signal INC*(0) for the register for bit 0 of the counter. The register for bit 0 of the counter is implemented as shown in the cell 705-I. An identical implementation of cell 705-I provides registers for bits 0–11 and 13–234 for the 24-bit register. The increment signal for I=0–11 is received on line 706 in a logic cell including AND-function 707, AND-function 709, and NOR-function 708 of complex gate 707/708/709, and also including inverter 710. The inputs to AND-function 707 include the INC*(I) signal and the Q* output of register 711 within the cell. The inputs to AND-function 709 include the inverse of the INC*(I) signal from line 706 supplied through inverter 710 to line 712, and the Q output of the register 711. The inputs to NOR-function 708 include the outputs from AND-function 709 and from AND-function 707 of complex gate 707/708/709. In addition, a third input to NOR-function 708 is the watchdog timer clear signal WDTCLR on line 217. The output of the complex gate 707/708/709 is supplied as the data input to the register 711. Register 711 is clocked by the output of the clocking circuit 701 across line 713. The clear input to the register 711 is the power-on clear signal POC generated by the reset driver as described with reference to FIG. 9. The Q output of register 711 is supplied as the bit TIMREG(I) for output on bus 220 as the timer value. The increment output, termed INC*(I+1) from the cell 705 for supply to the following cell termed on line 714 is generated at the output of NAND-gate 715. The inputs to NAND-gate 715 include the Q output of the register 711 and the signal on line 712 which is an active high value of INC*(1) from line 706.

As mentioned above, this cell 705-I is repeated for each of the bits of the TIMREG(23:0) timer value on bus 220 except for bit 12. Bit 12 is supplied at the output of register 716. This register is modified for the test mode. The test mode signal TMWDT on line 218 is supplied to the multiplexer 717 that includes AND-function 718, AND-function 719 and NOR-function 720. Inputs to AND-function 718 include the signal on line 721 which is generated at the output of inverter 722. The input to inverter 722 is INC*(12) from cell 705-11. A second input to AND-function 718 includes the test mode signal on line 218 supplied through inverter 730. The inputs to AND-function 719 include the TMWDT signal on line 218, and the signal on line 723 which is supplied at the output of inverter 724 which receives as its input the INC*(0) signal. Thus, the multiplexer 717 serves to select either the inverse of INC*(12) or INC*(0) for supply at its output on line 725 in response to the test mode signal TMWDT. Thus, in the test mode, the output of the timer register is accelerated by supplying the increment signal INC(0) for the first register in the 24-bit timer register as the input to the thirteenth register (705-12). The remainder of the logic supporting register 716 as indicated within the dotted lines 726, is identical to the logic in the cells 705-I for the remaining bits from the output of the timer.

The INC*(24) output from the register supplying bit 23 of the timer register is connected on bus 222 as the watchdog timer carry signal WDTCARRY* which allows for expansion of the timer.

III. Reset Driver and Power-Down Enable Circuitry

Figure 8:
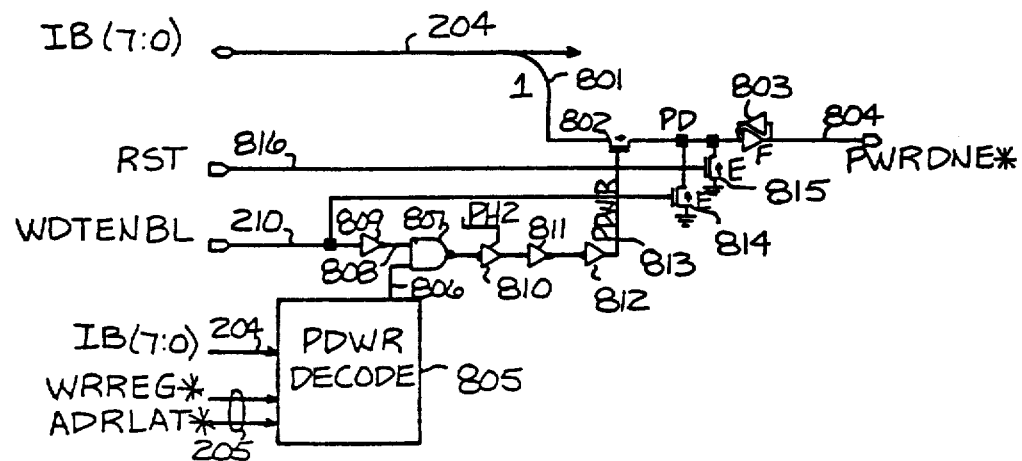
FIG. 8 is a logic diagram illustrating the power-down enable circuit according to the present invention.

FIGS. 8 and 9 illustrate circuits that implement further flexibility and reliability features for a processor employing a watchdog timer according to the present invention.

FIG. 8 illustrates the manner in which the watchdog timer enable signal WDTENBL is used to disable the power-down enabling signal PWRDNE* which is generated in processors such as the Intel 8051 to enable a power-down sequence. FIG. 9 illustrates the reset driver 108 from FIG. 1.

A. Power-Down Enable Circuitry

The power-down enable circuitry shown in FIG. 8 prevents assertion of the power-down enable signal while the watchdog timer enable signal is asserted. This is especially useful in systems in which the fixed-on bit is a preset value to enable the watchdog timer. Thus, a code supplied by a circuit element that is immune from electrostatic discharge, power glitches and errant software will disable the power-down enable sequence in the host processor.

In the Intel 8051, the power-down enable signal is asserted by writing a code in which bit position 1 corresponds to the power-down enable signal to a register. Accordingly, the internal bus 204 is connected to supply bit 1 across line 801 through pass gate 802 to the inverting latch 803. The output of the inverting latch is the power-down enable signal PWRDNE* on line 804. In order to write to the register that enables the power-down enable signal, the internal bus supplies an address and address control signals 205 to the power-down decode circuit 805. If the address indicates a write to the correct register, the output on line 806 is generated. That output is supplied to NAND-gate 807 which receives as its second input signal on line 808 from inverter 809 which in turn receives as its input the watchdog timer enable signal WDTENBL on line 210. The output of the NAND-gate 807 is passed through the phase 2 clocked inverter 810, inverter 811 and inverter 812 as the power-down write signal PDWR on line 813. The power-down write signal PDWR on line 813 is connected to enable the pass gate 802 during a power-down write. It can be seen that if the watchdog timer enable signal on line 210 is high, the power-down write signal is disabled by gate 807. In addition, the output of the pass gate 802 is connected to pulldown transistors 814 and 815. The input to pulldown transistor 814 is the watchdog timer enable signal on line 210 which serves to disable generation of the power-down enable signal PWRDNE* on line 804.

Pull-down transistor 815 receives at its gate the reset signal RST on line 816 which is generated as shown in FIG. 9. This causes a reset of the value in the power-down enable register.

B. Reset Driver 108

FIG. 9 illustrates the reset driver circuit 108 which generates a RST signal on line 900, the PINPOC signal on line 901 and the POC signal on line 925. The block in FIG. 1 is a simplified representation showing only the soft and hard reset features. Inputs to the reset driver 108 include the watchdog timer reset signal WDTRST from line 213 and the input supplied to the external reset pin 903. The input to the reset pin is supplied through input protection devices 904 to line 905. Line 905 is connected to buffer 906 having hysteresis characteristics to provide noise immunity for the reset input 903. The output of the buffer 906 is supplied on line 907 as an input to latch 908 (clocking not shown). Latch 908 supplies the PINPOC signal on line 901. In addition, the signal on line 907 is connected as one input to NOR-gate 909. A second input to NOR-gate 909 is the watchdog timer reset signal from line 213. The output of the NOR-gate is supplied through an inverter 910 as the RST signal on line 900. Thus, RST is asserted whenever a watchdog timer reset or an external reset is supplied to the chip. The PINPOC signal is asserted only when an external reset is asserted. The watchdog timer reset signal on line 213 is also supplied to latch 911 (clocking not shown), the output of which is supplied on line 902 to one input of NOR-gate 921. The other input to the NOR-gate 921 is PINPOC. The output of NOR-gate 921 is supplied through inverter 922 as the POC signal on line 925.

The reset driver 108 shown in FIG. 9 also includes a facility to provide a pulse on the reset pin 903 whenever the watchdog timer reset signal on line 213 is asserted. The watchdog timer reset signal on line 213 is connected as one input to NAND-gate 912. The inverse of the watchdog timer reset signal as supplied at the output of inverter 913 is connected at one input to NOR-gate 914. The input to inverter 913 is the watchdog timer reset signal from line 213.

NAND-gate 912 is clocked during phase 1 state 3 of the processor clock by clock circuitry 915. The NOR-gate 914 is clocked during phase 1 state 2 of the processor clock through clock circuitry 916. The output of NAND-gate 912 is supplied through inverter 917 at the base of a pulldown transistor 918. The output of NOR-gate 914 is supplied through inverter 919 at the base of P-channel transistor 920 which works as a pull-up transistor. Accordingly, at phase state 2 phase 1 of the processor clock, when the watchdog timer reset signal is on, the pull-up transistor 920 pulls up the reset pin 903. At state 3 phase 1, the pull-down transistor 918 will pull down the reset pin. This causes a pulse to be supplied at the reset pin 903 that can be detected by external circuitry to provide notice of a watchdog timer reset.

IV. Conclusion

In conclusion, the present invention provides a watchdog timer used for maintaining reliable operation of a microcontroller or processor performing real-time operations. The watchdog timer according to the present invention comprises a number of architectural features and design techniques that provide additional reliability and flexibility not found in other watchdog timers. In particular, the provision of a time-value code that is immune from eletrostatic discharge, power glitches and errant software along with feature-select bits that can be provided in cells which are immune from ESD, power glitches and errant software as well, provides a watchdog timer that will maintain correct operation even in harsh environments. Further protection from errant software is provided by protecting the programmable watchdog time value register from write access by errant software while the watchdog timer system is enabled and by making provision for a keyed sequence watchdog timer reset code. Finally, the driver for the reset signal generated in response to a watchdog timer has been adapted to discriminate between a reset caused by external reset circuitry driving the host processor's reset pin and a reset caused by the watchdog timer.

The foregoing description of the preferred embodiments of the present invention has been presented for purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. In an integrated circuit including a program controlled processor generating a status signal within preselected time intervals when operating properly, and responsive to a reset signal to reset the processor, an improvement comprising:
    means, adapted to be programmed, for storing a hardwired preset code indicating a preset time interval;
    decoding means, connected to the means for storing, for decoding the preset code to generate an interval code;
    timing means, connected to receive the status signal, for generating a timer code indicating elapsed time since receipt of the status signal;
    comparing means, connected to receive the hardwired preset code and the time code, for generating the reset signal when the elapsed time indicated by the time code exceeds the time interval indicated by the hardwired preset code;
    means, adapted to the programmed, for storing a hardwired preset enable signal; and
    means, responsive to the hardwired preset enable signal, for enabling the comparing means to generate the reset signal.

2. The improvement of claim 1, wherein the means for storing a hardwired preset enable signal comprises a depletion implant mask programmable transistor ROM cell.

3. The improvement of claim 1, wherein the processor includes a fuse addressing circuit for programming fuse cells and the means for storing a hardwired preset enable signal includes a fuse cell writable through the fuse addressing circuit.

4. In an integrated circuit including a program controlled processor generating a status signal within preselected time intervals when operating properly, and responsive to a reset signal to reset the processor, an improvement comprising:
    means, adapted to be programmed, for storing a preset code indicating a preset time interval;
    timing means, connected to receive the status signal, for generating a timer code indicating elapsed time since receipt of the status signal; and
    comparing means, connected to receive the preset code and the time code, for generating the reset signal when the elapsed time indicated by the time code exceeds the time interval indicated by the preset code wherein:
    the status signal comprises a keyed sequence of multi-bit keys, the multi-bit keys having an order; and
    the timer code generated by the timing means indicates elapsed time since the timing means last received the keyed sequence of multi-bit keys in the order.

5. The improvement of claim 4, wherein the timing means includes means, responsive to a clear signal, for clearing the timer code and means for incrementing the time code in order to indicate elapsed time, and wherein the keyed sequence includes a sequence of a first multi-bit key and a second multi-key; the improvement further including means for generating the clear signal comprising:
    means, connected to the processor, for detecting generation by the processor of the status signal;
    means, connected to the same for detecting and responsive to the status signal, for entering a first state if the status signal equals the first multi-bit key;
    means, connected to the means for detecting and to the means for entering and responsive to the first state and the status signal, for generating the clear signal if the status signal equals the second multi-bit key.

6. The improvement of claim 5, further including means, connected to the means for detecting and to the means for entering and responsive to the first state, for generating the rest signal if the status signal does not equal the first multi-bit key or the second multi-bit key.

7. In an integrated circuit including a program controlled processor generating a status signal within preselected time intervals when operating properly, and responsive to a reset signal to reset the processor, an improvement comprising:
    means, adapted to be programmed, for storing a preset code indicating a preset time interval;
    timing means, connected to receive the status signal, for generating a timer code indicating elapsed time since receipt of the status signal; and comparing means, connected to receive the preset code and the time code, for generating the reset signal when the elapsed time indicated by the time code exceeds the time interval indicated by the preset code;

wherein the processor includes a hardware reset input/output pin adapted to be connected to an external circuit, and the processor responds differently to a signal supplied to the hardware reset input/output pin than to the reset signal from the comparing means, and further including:

means, connected to the comparing means and receiving the reset signal, for generating a reset pulse for supplying to the external circuit through the hardware reset input/output pin; and means for discriminating between reset pulse and a signal supplied to the hardware reset input/output pin from the external circuit.

8. The improvement of claim 7, wherein the means for discriminating includes means for generating a hardware reset signal in response to a signal supplied to the hardware reset input/output pin from the external circuit.

9. In an integrated circuit including a program controlled processor generating a status signal within preselected time intervals when operating properly, and responsive to a reset signal to reset the processor, a circuit comprising:

means, adapted to be programmed, for storing a hardwired preset code indicating a preset time interval;

means, in communication with the processor, for storing under program control a programmable code indicating a programmable time interval, selecting means, connected to receive the preset code and the programmable code, for selecting the preset code or the programmable code as an output code in response to a selector control signal;

means for supplying the selector control signal to the selecting means;

timing means, connected to receive the status signal, for generating a timer code indicating elapsed time since receipt of the status signal;

comparing means, connected to receive the output code and the timer code, for generating the reset signal when the elapsed time indicated by the timer code exceeds the time interval indicated by the output code.

10. The circuit of claim 9, wherein the means for supplying the selector control signal includes means, adapted to be programmed, for supplying a hardwired signal as the selector control signal.

11. The circuit of claim 9, wherein the means for storing a hardwired preset code comprises a plurality of depletion implant mask programmable transistor ROM cells.

12. The circuit of claim 11, wherein the means for supplying the selector control signal includes means, adapted to be programmed, for storing a hardwired signal as the selector control signal.

13. The circuit of claim 9, wherein the means for supplying the selector control signal comprises a depletion implant mask programmable transistor ROM cell.

14. The circuit of claim 9, wherein the processor includes a fuse addressing circuit for programming fuse cells and the means for storing a hardwired preset code includes fuse cells writable through the fuse addressing circuit.

15. The circuit of claim 14, wherein the means for supplying the selector control signal includes a fuse cell storing the selector control signal, writable through the fuse addressing circuit.

16. The circuit of claim 9, further including:

means for storing a hardwired preset enable signal; and means, responsive to the hardwired preset enable signal, for enabling the circuit to generate the reset signal.

17. The circuit of claim 16, wherein the means for storing the hardwired preset enable signal comprises a depletion implant mask programmable transistor ROM cell.

18. The circuit of claim 16, wherein the processor includes a fuse addressing circuit for programming fuse cells and the means for storing a hardwired preset enable signal includes a fuse cell writable through the fuse addressing circuit.

19. The circuit of claim 9, further including:

means, responsive to an enable signal, for enabling the circuit to generate the reset signal;

means for supplying the enable signal to the means for enabling; and means, connected to the means for storing a programmable code and to receive the enable signal, for preventing the processor from changing the programmable code under program control while the circuit is enabled.

20. The circuit of claim 9, wherein the status signal comprises a keyed sequence.

21. The circuit of claim 9, wherein the timing means includes means, responsive to a clear signal, for clearing the timer code and means for incrementing the timer code in order to indicate elapsed time, and wherein the status signal includes a sequence of a first multi-bit key and a second multi-bit key; the circuit further including means for generating the clear signal comprising:

means, connected to the processor, for detecting generation by the processor of the status signal;

means, connected to the means for detecting and responsive to the status signal, for entering a first state if the status signal equals the first multi-bit key;

means, connected to the means for detecting and to the means for entering and responsive to the first state and the status signal, for generating the clear signal if the status signal equals the second multi-bit key.

22. The circuit of claim 21, further including means, connected to the means for detecting and to the means for entering and responsive to the first state, for generating the reset signal if the status signal does not equal the first key or the second key.

23. The circuit of claim 9, wherein the processor includes a hardware reset input/output pin to be connected to an external circuit, and the processor responds differently to a signal supplied to the hardware reset input/output pin than to the reset signal generated by the comparing means, and further including:

means, connected to the comparing means and receiving the reset signal, for generating a reset pulse for supplying to the external circuit through the hardware reset input/output pin; and means for discriminating between reset pulse and a signal supplied to the hardware rest input/output pin from the external circuit.

24. The circuit of claim 23, wherein the means for discriminating includes means for generating a hardware reset signal in response to a signal supplied to the hardware reset input/output pin from the external circuit.

25. In an integrated circuit including a program controlled processor generating a status signal within preselected time intervals when operating properly, and responsive to a reset signal to reset the processor, a circuit having improved immunity to errors from electrostatic discharge within the integrated circuit, the circuit comprising:
   means for supplying a preselected code indicating the preselected time interval;
   timing means, connected to receive the status signal, for generating a timer code indicating elapsed time since receipt of the status signal;
   comparing means, connected to receive the preselected code and the time code, for generating, when enabled by an enable signal, the reset signal when the elapsed time indicated by the timer code exceeds the timer interval indicated by the preselected code; and
   means, responsive to an enable signal, for enabling the timing means said means for enabling including,
      means, adapted to be programmed in a hardwired manner, for storing and providing a hardwired enable code, such that the electrostatic discharge cannot change the hardwired enable code which the means for storing and providing provides, and
      means, responsive to the hardwired enable code, for generating the enable signal.

26. The circuit of claim 25, wherein the processor including a power-down mode entered in response to a power-down enabling signal, and further including:
   means, connected to receive and responsive to the enable signal, for preventing assertion of the power-down enabling signal.

27. The circuit of claim 25, wherein the means for storing a hardwired enable code comprises a depletion implant mask programmable transistor ROM cell.

28. The circuit of claim 25, wherein the processor includes a fuse addressing circuit for programming fuse cells, and the means for storing a hardwired enable code includes a fuse cell writable through the fuse addressing circuit.

29. For use with a program controlled processor generating a status signal within preselected time intervals when operating properly, and responsive to a reset signal to reset the processor, an apparatus comprising:
   means for supplying a preselected code indicating the preselected time interval;
   timing means, connected to receive the status signal, for generating a timer code indicating elapsed time since receipt of the status signal;
   comparing means, connected to receive the preselected code and the timer code, for generating when enabled, the reset signal when the elapsed time indicated by the timer code exceeds the time interval indicated by the preselected code;
   means, responsive to an enable signal, for enabling the apparatus to generate the reset signal;
   means for supplying the enable signal to the means for enabling; and
   means, connected to the means for supplying a preselected code and to receive the enable signal, for preventing the processor from changing the preselected code while the apparatus is enabled.

30. The apparatus of claim 29, wherein the processor includes a power-down mode entered in response to a power-down enabling signal, and further including:
   means, connected to receive and responsive to the enable signal, for preventing assertion of the power-down enabling signal.

31. For use with a program controlled processor generating a status signal within preselected time intervals when operating properly, wherein the status signal includes a sequence of a first key and a second key, and responsive to a reset signal to reset the processor, an apparatus comprising:
   means for supplying a preselected code indicating the preselected time interval;
   timing means, connected to receive the status signal, for generating a timer code indicating elapsed time since receipt of the status signal, wherein the timing means includes means, responsive to a clear signal, for clearing the time code and means for incrementing the timer code in order to indicate elapsed time;
   means, connected to the processor, for detecting generation by the processor of the status signal;
   means, connected to the means for detecting and responsive to the status signal, for entering a first state if the status signal equals the first key;
   means, connected to the means for detecting and to the means for entering and responsive to the first state and the status signal, for generating the clear signal if, in the first state, the status signal equals the second key; and
   comparing means, connected to the means for detecting and to the means for entering and connected to receive the preselected code and the timer code, for generating the reset signal when the elapsed time indicated by the timer code exceeds the time interval indicated by the preselected code.

32. The apparatus of claim 31, further including means, connected to the means for detecting and to the means for entering and responsive to the first state, for generating the reset signal if in the first state the status signal does not equal the first key or the second key.

33. In an integrated circuit including a program controlled processor generating a status signal within preselected time intervals when operating properly, and responsive to an internal reset signal to reset the processor, wherein the processor includes a hardware reset input/output pin connected to an external circuit, and the processor responds differently to a signal supplied to the hardware reset input/output pin than to the internal reset signal, a circuit comprising:
   means for supplying a preselected code indicating the preselected time interval;
   timing means, connected to receive the status signal, for generating a timer code indicating elapsed time since receipt of the status signal;
   comparing means, connected to receive the preselected code and the timer code, for generating the internal reset signal when the elapsed time indicated by the timer code exceeds the time interval indicated by the preselected code;
   means, connected to the comparing means and receiving the internal reset signal, for generating a reset pulse for supply to the external circuit through the hardware reset input/output pin; and
   means for discriminating between the reset pulse and a signal supplied to the hardware reset input/output pin from the external circuit.

34. The circuit of claim 33, wherein the means for discriminating includes means for generating a hardware reset signal in response to a signal supplied to the hardware reset input/output pin from the external circuit.

* * * * *